United States Patent [19]

Okazaki et al.

[11] Patent Number: 5,340,958
[45] Date of Patent: Aug. 23, 1994

[54] METHOD AND APPARATUS FOR WIRE FEEDING IN A WIRE-CUT ELECTROEROSION APPARATUS

[75] Inventors: Shuji Okazaki; Kazo Urushizaki, both of Fukui, Japan

[73] Assignee: Sodick Co., Ltd., Yokohama, Japan

[21] Appl. No.: 98,886

[22] Filed: Jul. 29, 1993

[30] Foreign Application Priority Data

Jul. 31, 1992 [JP] Japan .................. 4-225248

[51] Int. Cl.[5] .................................. B23H 7/10
[52] U.S. Cl. .................. 219/69.12; 140/112; 219/69.17
[58] Field of Search .............. 219/69.12, 69.17, 56.1, 219/56, 56.22; 140/112

[56] References Cited

U.S. PATENT DOCUMENTS

| | | | |
|---|---|---|---|
| 3,891,819 | 6/1975 | Ullmann et al. | 219/69.12 |
| 3,949,790 | 4/1976 | Rass et al. | 140/112 |
| 4,379,959 | 4/1983 | Inoue | 219/69.17 |
| 4,645,894 | 2/1987 | Bonga | 219/69.12 |
| 5,237,145 | 8/1983 | Magara et al. | 219/69.12 |

FOREIGN PATENT DOCUMENTS

| | | |
|---|---|---|
| 149038 | 6/1981 | Fed. Rep. of Germany ...... 140/112 |
| 598499 | 2/1984 | Japan . |
| 63-139616 | 6/1988 | Japan . |
| 63-260723 | 10/1988 | Japan . |
| 2279221 | 11/1990 | Japan . |

Primary Examiner—Geoffrey S. Evans
Attorney, Agent, or Firm—Marks & Murase

[57] ABSTRACT

A wire feeding device for a wire-out electroerosion apparatus comprising a movable table (21) on which one of two clamps (35,45) for clamping a wire in use (2a) and a new wire (2b) from a spare bobbin, respectively, is provided. When the bobbin on which the wire in use is almost empty, one of the clamps (35) is moved into position opposite the other clamp (45) to thereby present a sheared end of the wire in use and a leading end of the new wire into abutting relationship. A welding circuit (80) joins the abutted wire ends whereby the joined wire may be smoothly fed past the various wire guides and into the machining slit formed in the workpiece, whereby continuous machining operations may be performed.

37 Claims, 11 Drawing Sheets

METHOD AND APPARATUS FOR WIRE FEEDING IN A WIRE-CUT ELECTROEROSION APPARATUS

FIELD OF THE INVENTION

The present invention relates to a method and apparatus for electroerosion using a wire electrode. More specifically, the present invention relates to a wire feeding apparatus and to a method for feeding a new wire unwound from a spare wire bobbin into a machining slit in a workpiece at a predetermined tension after machining operation with a wire fed from a first wire bobbin.

BACKGROUND OF THE INVENTION

In a wire-cut electroerosion apparatus for performing electrical discharge machining, during machining, a wire electrode is continuously fed from a wire bobbin to a machining slit at a predetermined rate of travel. Therefore, during automatic machine operation over a long period of time, the bobbin may run short or empty, and it will become necessary to change over to a spare wire bobbin and to feed or refeed new wire from the spare bobbin into the machining slit.

To change over from a first wire, unwound from a first bobbin over to new wire from a spare wire bobbin without joining the first wire to the new wire, a wire-cut electroerosion apparatus, such as described in Japanese Laid-Open Patent Publication No. 59-8499, may be provided having, for example, two wire transport paths, each of which includes a respective brake device, a pair of feed rollers, a rod electrode for melting a wire, and an upper wire guide. The first wire is supplied along one of the wire travel paths to the inlet of a suction pipe and the suction pipe guides the wire through a workpiece to a pair of receiving rollers. After cutting the desired contour on the workpiece using the first wire, the wire is cut and new wire from a spare bobbin may be supplied along the other wire transport path and guided through the workpiece to the pair of receiving rollers by means of the suction pipe.

Japanese Laid-Open Patent Publication No. 63-139616 also discloses a wire-cut electroerosion apparatus having multiple wire bobbin mounting means, a wire tensioning means, and a wire supply means including wire guide means for automatically positioning and supplying multiple wire electrodes. Further, the apparatus is provided with wire guide moving means for attachably and movably supporting one of multiple wire supplying means whereby a wire electrode to be used may be automatically and selectively changed.

In each of the above disclosures, two or more wire transport paths are provided. Consequently, they require a complicated construction and increased cost. Further, it is troublesome to lead multiple wires from multiple bobbins to the upper wire positioning guides along multiple wire transport paths, including stretching the wires over a number of rollers by hand in order to prepare for machining.

Japanese Laid-Open Patent Publication No. 2-279221 discloses a wire-cut electroerosion apparatus which is provided with a wire joining means which precedes a wire tensioning device. A clamping means fixed to a carriage clamps the top of a new wire which has been pulled out from a spare wire bobbin. A first wire electrode is stopped and then clamped by the clamping means. The carriage then moves to cross the first wire and the new wire. The wire joining means joins the first wire to the new wire. Then a cutter which precedes the wire joining means in the direction of wire travel, cute the joined wire off of the first wire bobbin. The joint of the two wires is fed forward along the wire transport path, which includes the wire tensioner. A pair of joint cutters cut the joint before it reaches a pipe guide which is provided for guiding the wire into an upper wire positioning guide and through the work zone. After the joint is removed, the wire is supplied into the pipe guide.

Thus, in the disclosed device, two wires are crossed and joined together. The device has an advantage in that the wire joining operation is easy. However, the cross sectional area of the joint is larger than a single wire diameter, and is similar to a joint created by a thread splicing device in a spinning machine. Moreover, two surplus wire pieces extending beyond the joint are left over. Therefore, the joint between the wires may be snatched or snagged by rollers or by a wire tensioner positioned along the wire transport path. Further, the joint must be removed in order for the new wire to pass through the pipe guide, and/or wire guide, and into the machining slit in the workpiece. In an automatic wire threading device using a pipe guide, the inner diameter of the pipe guide is only slightly larger than the wire diameter in order to precisely guide the leading end of wire into a start hole or the machining slit in the workpiece. For example, the inner diameter of the pipe guide is generally about 1 mm when using a 0.2 mm diameter wire. In general, the disclosed device only provides a wire-cut electroerosion apparatus having an automatic wire threading device for making it possible to-cut multiple closed contours on the workpiece or as a precaution against wire breakage.

However, the wire joining means of the above disclosure has no provision for detecting whether the two wires have been reliably joined together. Moreover, no means for automatically resetting the wires to retry the wire joining operation, for example, if the wires burn out at the cross or winding point due to a large current flow or separate because the wires are not sufficiently joined together, is provided.

In addition, this apparatus includes a structure in which a new wire can be pulled out only from a right or a left bobbin. Therefore, it is impossible to perform a next wire change, even if the empty bobbin is replaced with a new spare wire bobbin. Thus, automatic and continuous machining operations, which require continuously supplying a spare wire bobbin, are difficult.

Further, the above disclosed wire joining means did not always provide sufficient operational reliability when used as a wire refeeding device, making it difficult to realize complete automatic operation.

SUMMARY OF THE INVENTION

An object of the present invention is to provide a wire feeding device and a method for wire-cut electroerosion in which a new wire being joined to a first wire can be smoothly fed forward along a wire transport path, including a wire tensioning device, to reach a machining slit in a workpiece or otherwise extend through the working zone.

It is another object of the present invention to provide a wire feeding method and device, including a provision for checking and retrying the joint between wires whereby the reliability of the wire joining operation is increased.

It is further an object of the invention to provide a wire feeding device and method in which the joined wire is smoothly fed into and through a machining slit and/or wire guides without the need to remove the joint between the wires.

Additional objects and advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

A general aspect of the present invention is the provision of a wire feeding device for a wire-cut electroerosion apparatus having a first wire, a new wire, a first bobbin on which the first wire is wound, and a spare bobbin on which the new wire is wound, both of the bobbins being replaceable with an alternate bobbin for feeding the new wire forward, e.g., into a machining slit in a workpiece, after stopping the traveling of the new wire along a wire transport path. A cutter for cutting the first wire off the first bobbin and a clamp for clamping the sheared end may be positioned along the wire transport path. Advantageously, a table is provided adjacent to the clamp for the first wire. A clamp for clamping a leading end of the new wire outside the wire travel path may also be provided on the table. In this arrangement, the table moves to traverse the wire transport path, whereby the clamps may be opposingly positioned relative to each other. Either one of the clamps may be actuated toward the other so that the leading end of the new wire and the trailing end of the first wire abut against each other. Then, a welding circuit, or the like, may be used to join the abutted wire ends together. The joined wire can then travel forward, e.g., into the machining slit, along the wire transport path.

Preferably, a welding circuit may be connected to the clamps to cause welding current to flow through the abutted wire ends. In accordance with a preferred embodiment of the present invention, a pair of clamp rollers may be provided for feeding the first wire forward or backward so that the trailing end thereof will be positioned slightly protruding from the clamp for the first wire. Another pair of clamp rollers may be also provided on the movable table for feeding the new wire forward or backward so that the leading end thereof will be positioned slightly protruding from the clamp for the new wire. Preferably, the cutter for the first wire is provided on the table. Another cutter may be provided for trimming the tip of the new wire prior to the joining of the wire ends. Additionally, an annealing circuit may be provided for annealing part of the joined wire, including the joint between the wires. Preferably, a train of rollers may be provided along the wire travel path for rolling the joint of wires, thereby decreasing the size of the joint so that it will smoothly pass through the wire transport path, including the machining slit end wire guides.

Another aspect of the present invention is the provision of a method for feeding a wire in a wire-cut electroerosion apparatus having a first wire, a new wire, a first bobbin on which the first wire is wound, a spare bobbin on which the new wire is wound, a first clamp and a second clamp, and wherein the first and spare bobbins are replaceable with an alternate bobbin for feeding the new wire forward, e.g., into a machining slit in a workpiece, after stopping the traveling of the first wire along a wire transport path by (a) cutting the first wire off the first bobbin, (b) clamping the trailing end of the first wire along the wire transport path by means of the first clamp. (c) clamping a leading end of the new wire, drawn out from the spare bobbin at a position outside the wire transport path by means of the second clamp, (d) moving the second clamp into a position whereby the trailing end of the first wire and the leading end of the new wire oppose each other, (e) butting the leading end of the new wire and the trailing end of the first wire against each other, (f) joining the abutted wire ends together, and (g) feeding the joined wire through the wire transport path, including into the machining slit.

This aspect of the present invention may preferably further comprise the following. Step (f) may include passing a welding current through the wires between the first and second clamps. Further, the method may preferably include trimming a tip of the new wire prior to joining the wire ends, and the step of annealing the joined wire in the vicinity of the joint. Further, the method may preferably include the step of decreasing the diameter of the joint between the wires whereby the joint may smoothly pass through the wire transport path, including the machining slit.

A further aspect of the present invention comprises a method for feeding a wire in a wire-cut electroerosion apparatus having a first wire, a new wire, a first bobbin, and a spare bobbin on which the new wire is wound, in which the new wire is fed through the wire transport path, including into a machining slit in a workpiece, after stopping the feeding of the first wire along a wire travel path, including the steps of (a) cutting the first wire off the first bobbin, (b) aligning the leading end of the new wire and the trailing end of the first wire in an abutting relationship, (c) joining the abutted wire ends together, (d) checking the joining of the wire ends, and (e) restarting the feeding of the joined wire into the machining slit through the wire transport path.

This embodiment of the present invention may further preferably include the following aspects. The step (d) may include detecting the existence of electrical conductivity between the wires and/or applying a tensile stress on the joint. Alternatively, the step (d) may include detecting the existence of feed motion of one of the wires when feeding the other wire. Preferably, the tips of the first and new wires are trimmed and butt joining retried when a wire joining failure is detected.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

FIGS. 1–4 are provided to explain the presently preferred embodiment of a wire feeding device according to the present invention. FIGS. 5–11 are provided to explain the presently preferred embodiment of a wire changing method according to the present invention, the method being associated with the operation of the device shown in FIG. 1 and including a checking operation and a re-joining operation in the event of a failed Joining operation.

Figure 1:
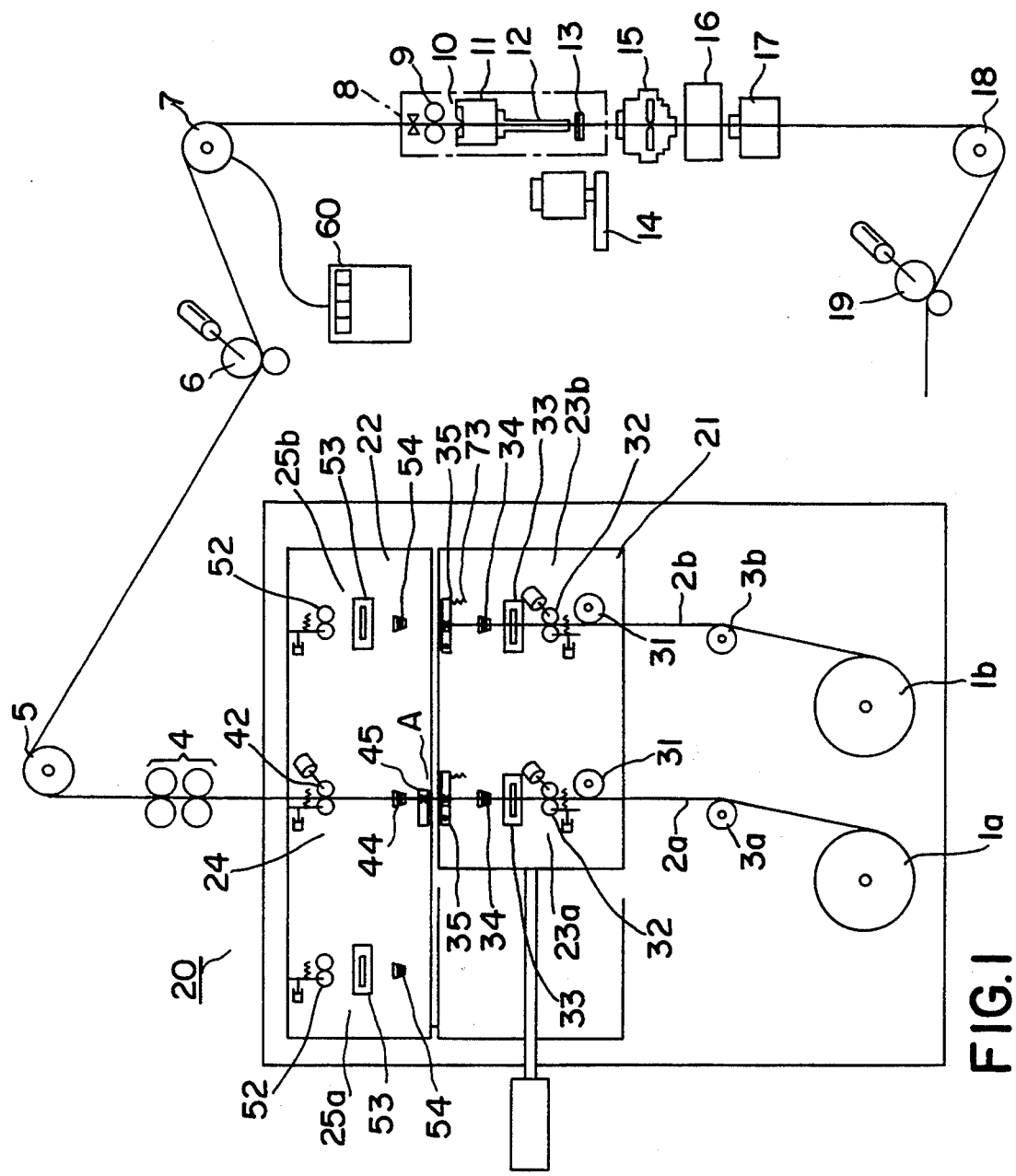
FIG. 1 illustrates, in schematic form, a front view of the wire feeding device in a wire-cut electroerosion apparatus according to the present invention.

FIG. 1 shows the wire feeding device in a wire-cut electroerosion apparatus according to an embodiment of the present invention. In FIG. 1, a first wire $2a$, wound on a bobbin $1a$ and a new wire $2b$, wound on a spare bobbin $1b$, are provided. The first wire $2a$, unwound from the bobbin $1a$, is fed around a guide pulley $3a$ to a wire joining device 20. The wire $2a$ is fed along a wire travel path, which includes a train of rollers 4, a pulley 5, a wire tensioning device 6, and a pulley 7. The pulleys 5 and 7 are provided for changing the direction of wire travel. A wire residue counter 60 is associated with the pulley 7 to detect the amount of wire left for use on the bobbin $1a$. As will be apparent to the artisan, the wire transport path may also include such mechanisms as a wire tension detector, a wire breakage detector, and a number of other pulleys and rollers. However, for clarity and to avoid obscuring the invention, these mechanisms are omitted in the figure.

The wire $2a$ is fed forward to an automatic wire threading device having a wire guide 8, a pair of feed rollers 9, a pressured fluid chamber 11 and a pipe guide 12. A guide 10 may be provided on the pressured fluid chamber 11 to prevent fluid backflow. During wire threading operations, a pressured fluid is forced into the pipe guide 12 through the chamber 11 to align and help advance the wire $2a$, which is driven by the feed rollers 9. A cutter 13 and device 14 for disposing of debris are provided directly under the pipe guide 12 to cut off a leading end of a wire when the threading of the wire into the machining slit in a workpiece 16 is not successful. This automatic wire threading device using the pipe guide 12 is conventional.

The workpiece 16 is positioned between an upper wire guide block 15 and a lower wire guide block 17, each of which is equipped with a wire positioning guide and current pickup in a conventional manner wellknown to artisans. The machining slit formed between the workpiece 16 and the traveling wire $2a$ is filled with a dielectric fluid. The wire $2a$ is fed to the machining slit at a predetermined rate of travel and maintained under a predetermined tension during machining. The used wire is taken up by a wire take-up device 19 through a change of direction roller 18.

The wire joining device 20 preferably includes a table 21, which is movable from side to side in the plane of the figure, and a fixed base 22 which is arranged along the plane of the transport path of the first wire $2a$ as it is unwound from the first bobbin $1a$. The table 21 and the base 22 are adjacent to each other, the table 21 being closer to the first and spare bobbins $1a$ and $1b$, respectively. Two in-feed units $23a$ and $23b$ are provided on the table 21 along the feed directions of the wires $2a$ and $2b$, which is orthogonal to the direction of movement of the table 21. The stroke of the table 21 in the right/left direction in the figure is equal to the pitch between the in-feed units $23a$ and $23b$. One of the in-feed units $23a$ and $23b$ opposes an out-feed unit 24, provided on the base 22 and positioned at one of the stroke limits of the table 21. Preferably, an air cylinder (unnumbered) may be provided to move the table 21.

Preparatory units $25a$ and $25b$ may be provided on the base 22, preferably at its sides, each at the same distance from the out-feed unit 24 as the distance between the in-feed units $23a$ and $23b$. Each of the in-feed units $23a$ and $23b$ preferably comprises a guide pulley 31, a pair of clamp rollers 32, a cutter 33, a wire guide 34 and a clamp 35, positioned in that order in the direction of wire travel. Each guide pulley 31 is a freely rotating pulley for maintaining the proper alignment between the wires $2a$ and $2b$ and in-feed units $23a$ and $23b$ when moving the table 21.

Figure 4:
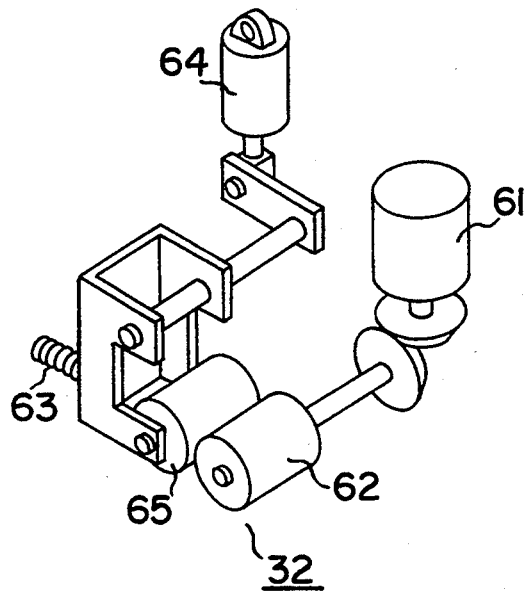
FIG. 4 is a schematic representation in a perspective view of a pair of clamp rollers.
Figure 5:
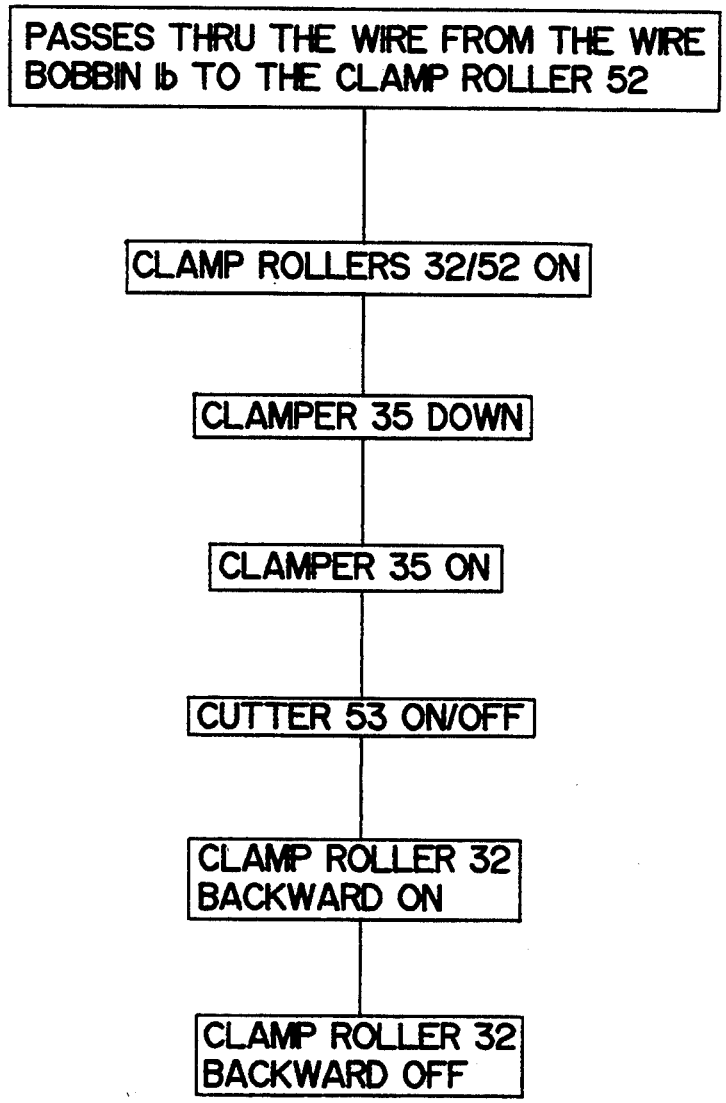
FIG. 5 is a flowchart of the preliminary operations on a new wire.

As best seen in FIG. 4, the clamp rollers 32 preferably comprise a drive roller 62, which is driven by a motor 61 and held at a fixed position, and a follower roller 65, which resiliently contacts the drive roller 62 by means of a spring 63, for example. The follower roller 65 and drive roller 62 can be separated, for example, by means of an air cylinder 64.

Figure 2:
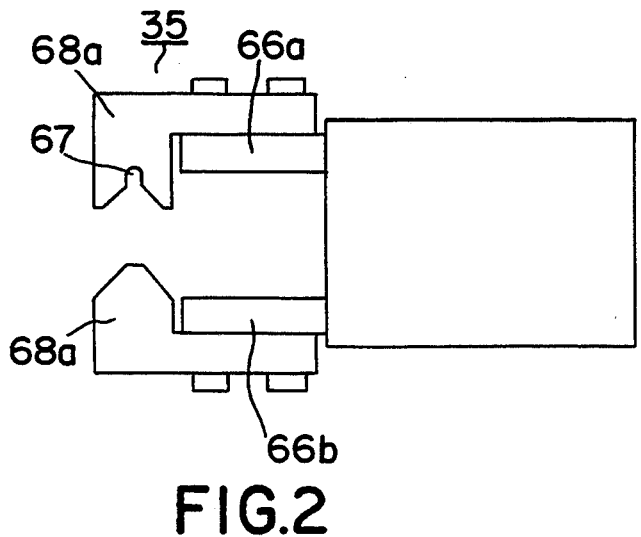
FIG. 2 illustrates, in schematic form, a top view of a clamp in accordance with the present invention.

The cutter 33 is preferably a shearing cutter, constructed so that a shearing blade moves orthogonally to the wire axis by means of an air cylinder (not illustrated), or a similar device. The wire guide 34 for guiding a wire may be in the form of a guide having a small bore, diverging from its center towards its upper and lower ends. As best seen in FIG. 2, the clamp 35 is preferably provided with jaws $66a$ and $66b$, which open and close by means of a built-in air cylinder, or the like, and is preferably provided with finger-like members $68a$ and $68b$. On a tip of the finger $68a$, a V-shaped groove is formed having a recess 67 at its bottom, while on a tip of the finger $68b$, a V-shaped block is formed. The finger-like members $68a$ and $68b$ oppose each other and, in the illustrated embodiment, are attached to jaws $66a$ and $66b$, respectively. In this arrangement, when the jaws $66a$ and $66b$ close, a wire is positioned and gripped at the recess 67 with a force smaller than that exerted by the clamp roller 32.

Figure 3:
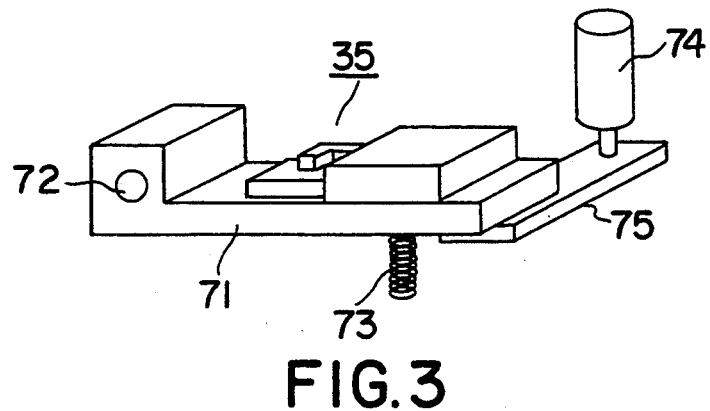
FIG. 3 is a perspective view showing, in schematic form, the construction of a clamp actuated along a wire axis.

In the illustrated embodiment, the clamp 35 in the in-feed unit advances and retracts with respect to a clamp 45 in the out-feed unit 24. As best seen in FIG. 3, the clamp 35 is preferably fixed on a bracket 71, which is swingably attached to the table 21 by means of a pin 72. A spring 73 is attached on the bracket 71. Preferably, an air cylinder 74, or the like, is provided at the rear of the table 21, and a jaw 75, connected to the air cylinder 74, extends to the bottom of the bracket 71. In the illustrated arrangement, the clamp 35 is biased toward the opposing clamp 45 by means of the spring 73 and may be retracted therefrom when the air cylinder 74 is actuated.

The out-feed unit 24 may consist of the clamp 45, a wire guide 44, and a pair of clamp rollers 42, positioned in that order in the direction of wire travel. Except that the clamp 45 is preferably fixedly attached to the base 22, the clamp rollers 42 and clamp 45 may have the same construction as clamp rollers 32 and clamp 35, respectively.

Each of the preparatory units 25a and 25b include a wire guide 54, a cutter 53, and a pair of clamp rollers 52, positioned in that order in the direction of wire travel. The wire guide 54 and the cutter 53 may be of the same construction as the wire guide 34 and the cutter 33 in the in-feed unit. However, the clamp rollers 52 do not include a driving motor, such as the motor 61.

Figure 14:
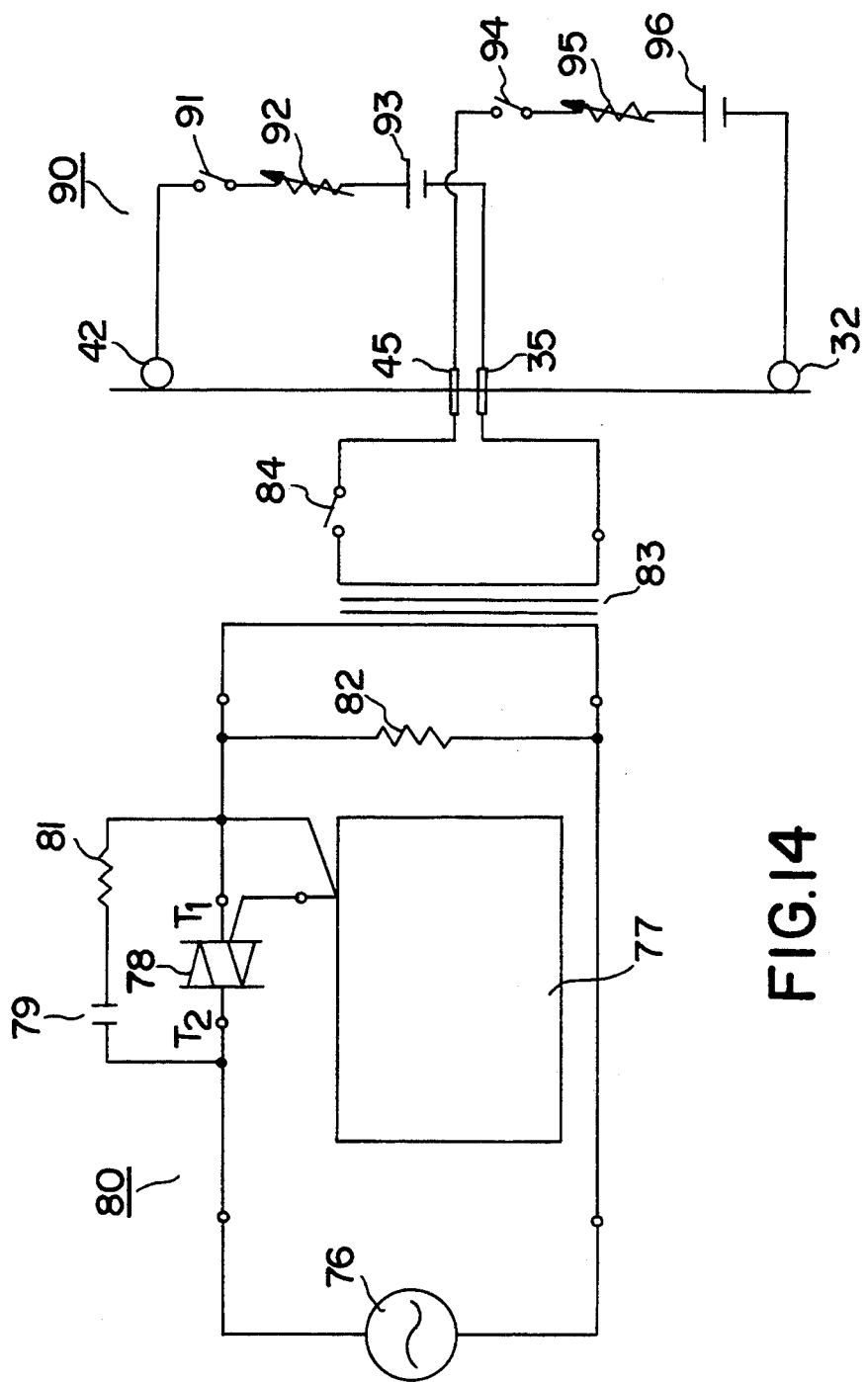
FIG. 14 is a circuit diagram showing a basic circuit for supplying current for welding and annealing the wire.

In the illustrated embodiment, the clamps 35 and 45 may function as electrodes or contacts for supplying a welding current to the abutted wire portions. Normally, it is desirable for the clamps 35 and 45 to perform such a current supplying function. As best seen in FIG. 14, a welding current supply device 80 is connected to the clamp electrodes 35 and 45 and includes an a.c. power source 76, a gate oscillating circuit 77, a triac 78, a capacitor 79, resistors 81 and 82, a transformer 83, and a switch 84. The clamp rollers 42 and 32 may also form electrodes for passing an annealing current from an annealing current supply device 90, which supplies an annealing current to the vicinity of the joint between the ends of the wires. In this embodiment, the annealing current supply device 90 consists of two circuits: one circuit connected between the clamp roller 42 and the clamp 35, and including a switch 91, a variable resistor 92, and a power source 93; and another circuit connected between the clamp roller 32 and the clamp 45, and including a switch 94, a variable resistor 95, and a power source 96. The welding current supply device 80 and the annealing device are well-known and its details are omitted.

The operation of wire feeding will now be described with reference to FIGS. 5–11.

Figure 7:
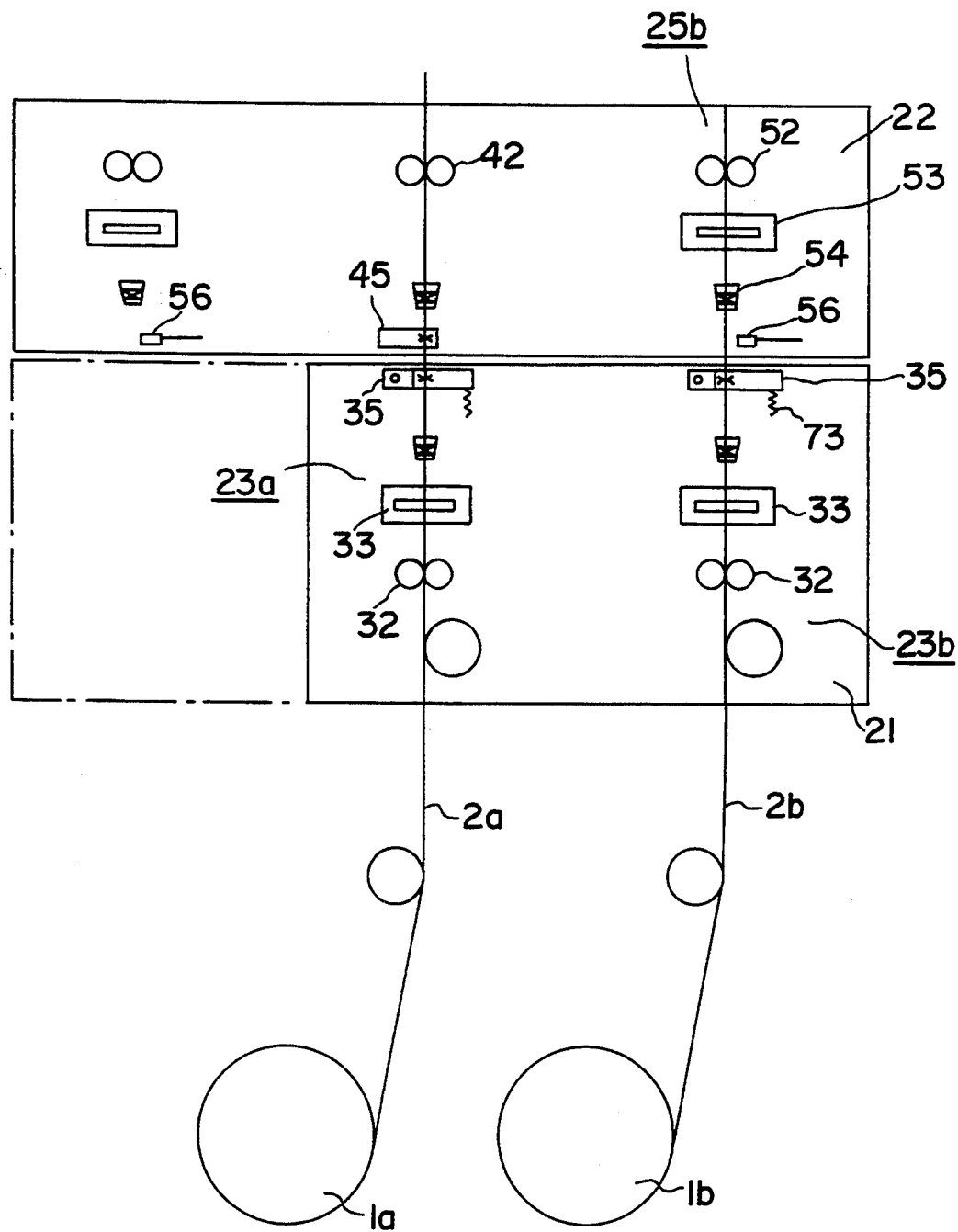
FIG. 7 illustrates, in schematic form, a front view of an embodiment of the present invention during preliminary operations.

As best seen in FIG. 7, prior to a wire joining operation, a setting operation for the new wire is carried out using the in-feed unit 23b and the preparatory unit 25b with the table 21 positioned, in the illustrated example, at its right stroke limit. This new wire setting operation will now be described with reference to the flowchart shown in FIG. 5.

First, the new wire 2b is pulled out from the spare bobbin 1b mounted at a predetermined position to pass through the in-feed unit 23b into the preparatory unit 25b. Then, the pairs of clamp rollers 52 and 32 are closed to pinch the new wire 2b. The clamp rollers 32 feed the wire 2b downward for a small amount to apply a tensile force on the wire between the clamp rollers 52 and 32. Alternatively, if the clamp rollers 52 are equipped with a drive motor, the clamp rollers 52 may feed the wire 2b upward for a small amount to apply a tension to the wire, or the spare bobbin 1b may rewind the wire 2b for a small amount. At this time, the clamp 35 is in a lowered position due to actuation of the air cylinder 74.

Next, the cutter 53 cuts off the leading end of the wire 2b. The clamp rollers 32 then feed the wire 2b downward and stop feeding when the sheared leading end of the wire 2b reaches a position slightly protruding from the clamp 35. As shown in FIG. 7, a sensor 56 may be provided for the purpose of detecting the presence of the sheared end to stop the driving action of the clamp rollers 32.

Figure 6:
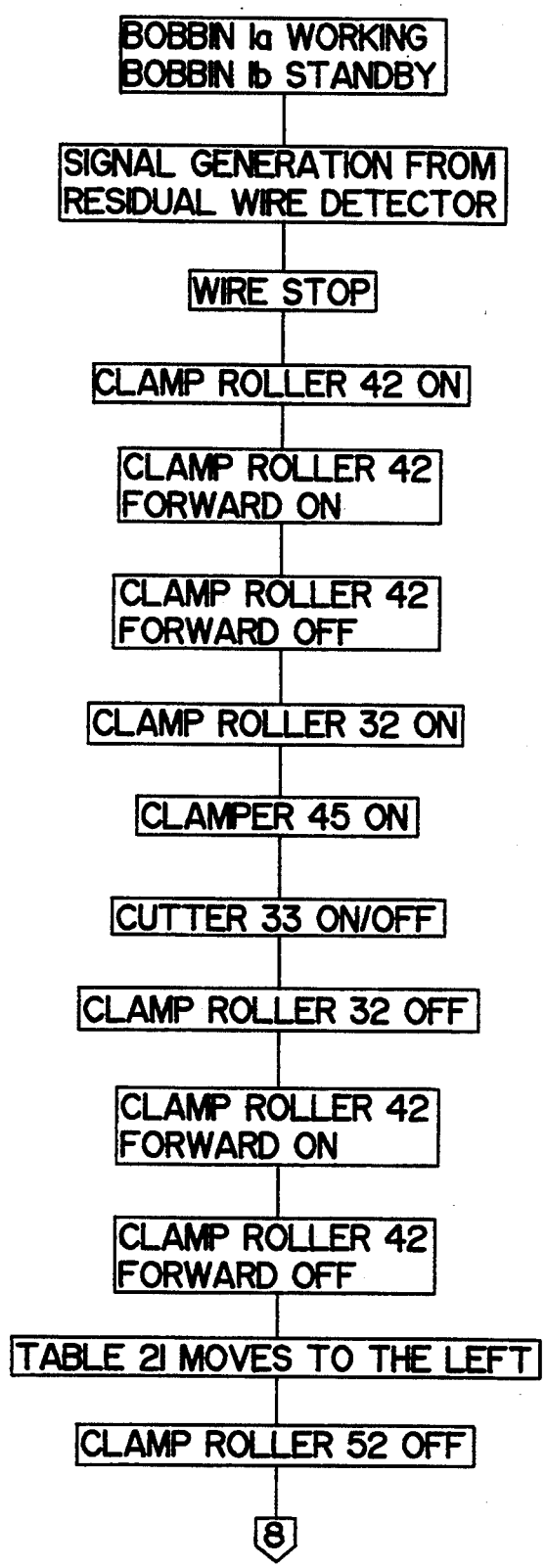
FIG. 6 is a flowchart of the preliminary operations on a first wire.

At this point, the joining operation continues to the first step of the flowchart shown in FIG. 6. The wire 2a is being continuously unwound from the bobbin 1a and is travelling into the electrical discharge machining gap, while the spare bobbin 1b is on stand-by status. When the wire residue counter 60 detects the residual amount of the wire 2a has fallen below a specific amount, the wire take-up device 19 (FIG. 1) stops the travel of the wire. The clamp rollers 42 in the out-feed unit 24 then close and feed the wire 2a upward by a desired amount so that the wire 2a becomes slack above the clamp rollers 42. This desired slack in the wire 2a is provided in order to permit feeding the wire 2a downward to the in-feed unit during any retry operation (described below) which may be required.

The operation for cutting the wire 2a off the bobbin 1a and positioning the sheared trailing end is carried out using the out-feed unit 24 and the in-feed unit 23a. After the clamp rollers 42 stop feeding the wire 2a upward, the clamp rollers 32 close to pinch the wire 2a. The clamp rollers 32 then feed the wire 2a downward a small amount to apply a tensile force on the wire between the clamp rollers 42 and 32. The clamp 45 closes. The cutter 33 cuts the wire 2a off the bobbin 1a and the clamp rollers 32 open to release the sheared end, which is contiguous with the wire (if any) remaining on the bobbin 1a. The clamp rollers 42 feed the wire 2a upward until the other sheared end of the wire 2a reaches a position where it is slightly protruding from the clamp 45. This positioning of the sheared trailing end is accomplished by controlling the amount of roll of the clamp rollers 42.

Figure 9:
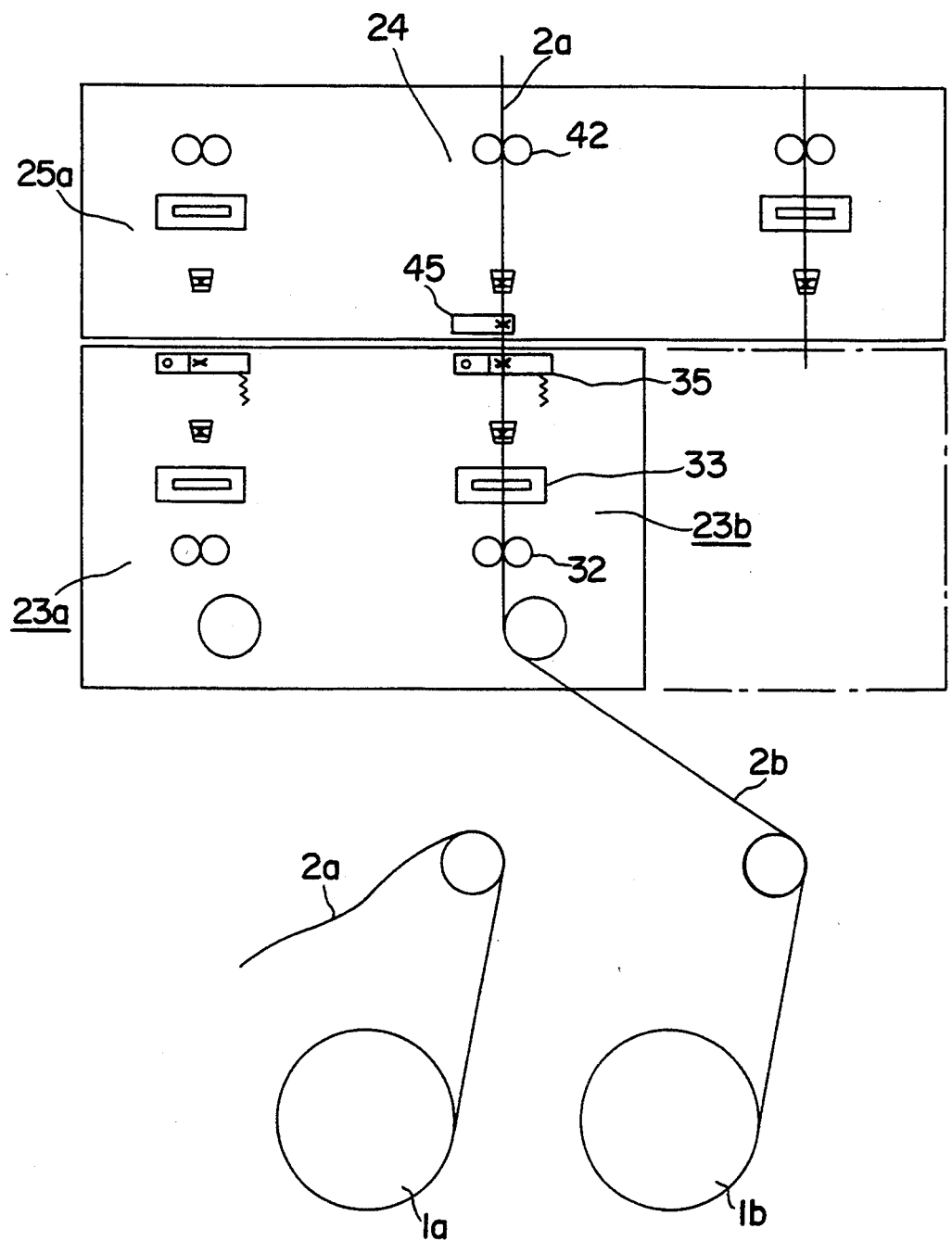
FIG. 9 illustrates, in schematic form, a front view of an embodiment of the present invention during the operation of wire Joining and confirmation of joining.

Then, the table 21 moves to the left, as viewed in FIG. 7, until it is positioned at its left stroke limit, as shown in FIG. 9. At this time, the sheared end of the wire 2a, which is contiguous with the bobbin 1a, is removed from the in-feed unit 23a. The clamp 35, which is holding the leading end of the new wire 2b (which is contiguous with the wire on the bobbin 1b) is moved into position opposite the clamp 45. The clamp rollers 52 then open to remove any remaining wire 2b, which was sheared off the wire from the bobbin 1b.

Figure 12:
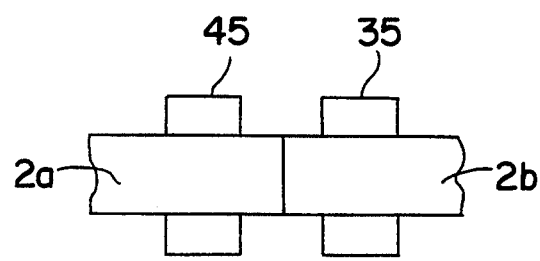
FIG. 12 is an enlarged view showing, in schematic form, the butting of the sheared wire ends.
Figure 13:
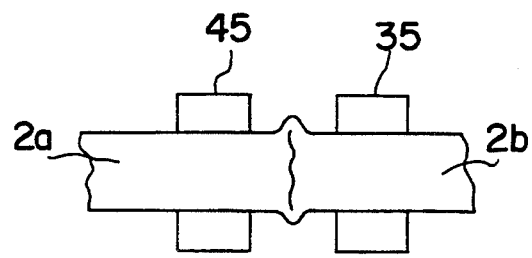
FIG. 13 is an enlarged view showing, in schematic form, the joining of the wire ends.

Next, the operations for joining the wire ends and for checking the joining of wires are carried out. The joining operation will now be described in connection with FIG. 8. The clamp rollers 32 feed the wire 2b upward a small distance to slightly slacken the wire between the clamp rollers 32 and the clamp 35. The clamp 35 is lifted to its upper position to position the sheared trailing end of the wire 2a and the sheared leading end of the wire 2b into a mutual abutting relationship, as best seen in FIG. 12. The welding current supply device 80 then supplies a welding current to the abutted wire portions through the clamps 45 and 35 to join the sheared ends of the wires 2a and 2b together, as shown in FIG. 13.

The joint of wires has relatively tough tensile strength; however, it has poor flexural strength. The wire in the vicinity of the joint is then annealed so as not to create a concentrated bending force on the joint when the joined wire travels through a number of rollers, The annealing operation may b accomplished as follows, The clamp 45 is opened, Then, the annealing current supply device 90 anneals the joined wire between the clamp roller 42 and the clamp 35. After the above-noted annealing, the clamp 45 closes and the clamp 35 is opened. Then, the annealing current supply device 90 anneals the joined wire between the clamp roller 32 and the clamp 45.

Then, the joint is preferably checked for integrity. The clamp 45 is opened. The clamp rollers 42 then feed the wire upward a very small amount. The clamps 35 and 45 close and a small current is applied across the clamps 35 and 45 to detect whether there is electrical continuity between the clamps 35 and 45. If there is no electrical continuity between the clamps 35 and 45, a determination is made that the joining of the wire ends was not successful. The table 21 is then returned to the right, as viewed in FIG. 10, to initiate a retry operation.

Alternatively, electrical continuity between the clamp rollers 42 and 32 may be detected without closing the clamps 35 and 45. Further, instead of detecting electrical continuity, a feed motion of either one or both of the old and new wires 2a and 2b may be detected to check the joining of wires when one is fed away from the other.

If there is electrical continuity between clamps 32 and 45, indicating that the wire ends are successfully joined, or other indicia of a successful joint are present, the joined wire is fed forward into the pipe guide 12 along the wire transport path after releasing the clamps 35 and 45, and pairs of clamp rollers 32 and 42. As shown in FIG. 13, the joint between the wires may have a slightly larger diameter than the diameter of the wire itself. For example, the joint diameter may be as much as 0.3 mm when using a wire with a diameter of 0.2 mm. Therefore, although the joined wire can be smoothly fed along the wire transport path, and can freely pass through the guide 10 on the pressured fluid chamber 11, it may be difficult to pass the wire through the positioning guides contained in the upper and lower wire guide blocks 15 and 17. A wire positioning guide generally has an inner diameter of 0.22 mm to 0.21 mm when using a wire with a diameter of 0.2 mm. Therefore, it may be necessary to stop the wire when the joint reaches the vicinity of the exit of the pipe guide 12 before the cutter 13. The cutter 13 then cuts the wire. The preceding part of the cut wire is taken up by the wire take-up device 19 while the following part, including the joint, is fed forward for a small amount. The wire tip disposer 14 grips the joint, and the cutter 13 cuts off the joint. The wire tip disposal 14 then removes the joint. Next, the wire is threaded into the positioning guides in the wire guide blocks 15 and 17 and the machining slit using the pipe guide 12. The wire is fed forward by the rollers 9 until it is taken up by the wire take-up device 19.

Alternatively, a train of rollers 4 may roll the joint to decrease its diameter so that the wire may be fed forward through the positioning guides in the guide blocks 15 and 17 and through the machining slit without removing the joint. This may be especially preferable if the workpiece 16 is of a large thickness or other circumstance which may indicate a possible difficulty for wire threading.

While the machining is performed using new wire 2b from the bobbin 1b, the bobbin 1a is dismounted and replaced by a new spare bobbin. The setting operation for the new wire unwound from the new spare bobbin 1a is carried out using the in-feed unit 23a and the preparatory unit 25a with the table 21 positioned at its left stroke limit using the procedures described in the flow-chart of FIG. 5. However, now the wire from the bobbin 1b will be replaced with the new wire from the bobbin 1a with the same operations as that described above (except that direction of movement of the table 21 will be reversed) when the bobbin 1b is almost empty. By repeating such operations, an electric discharge machine may be continuously operated.

Figure 10:
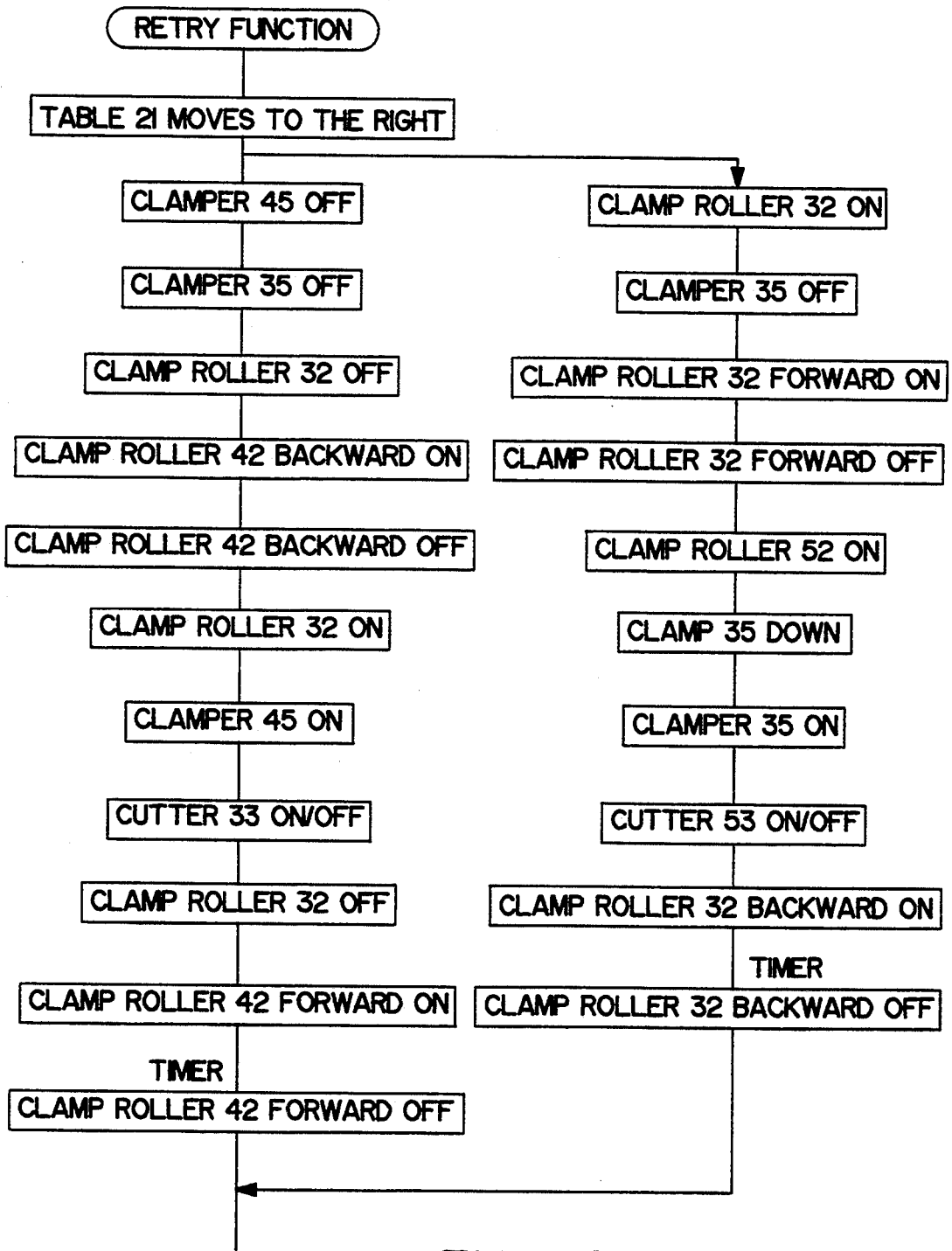
FIG. 10 is a flowchart of a retry operation.
Figure 11:
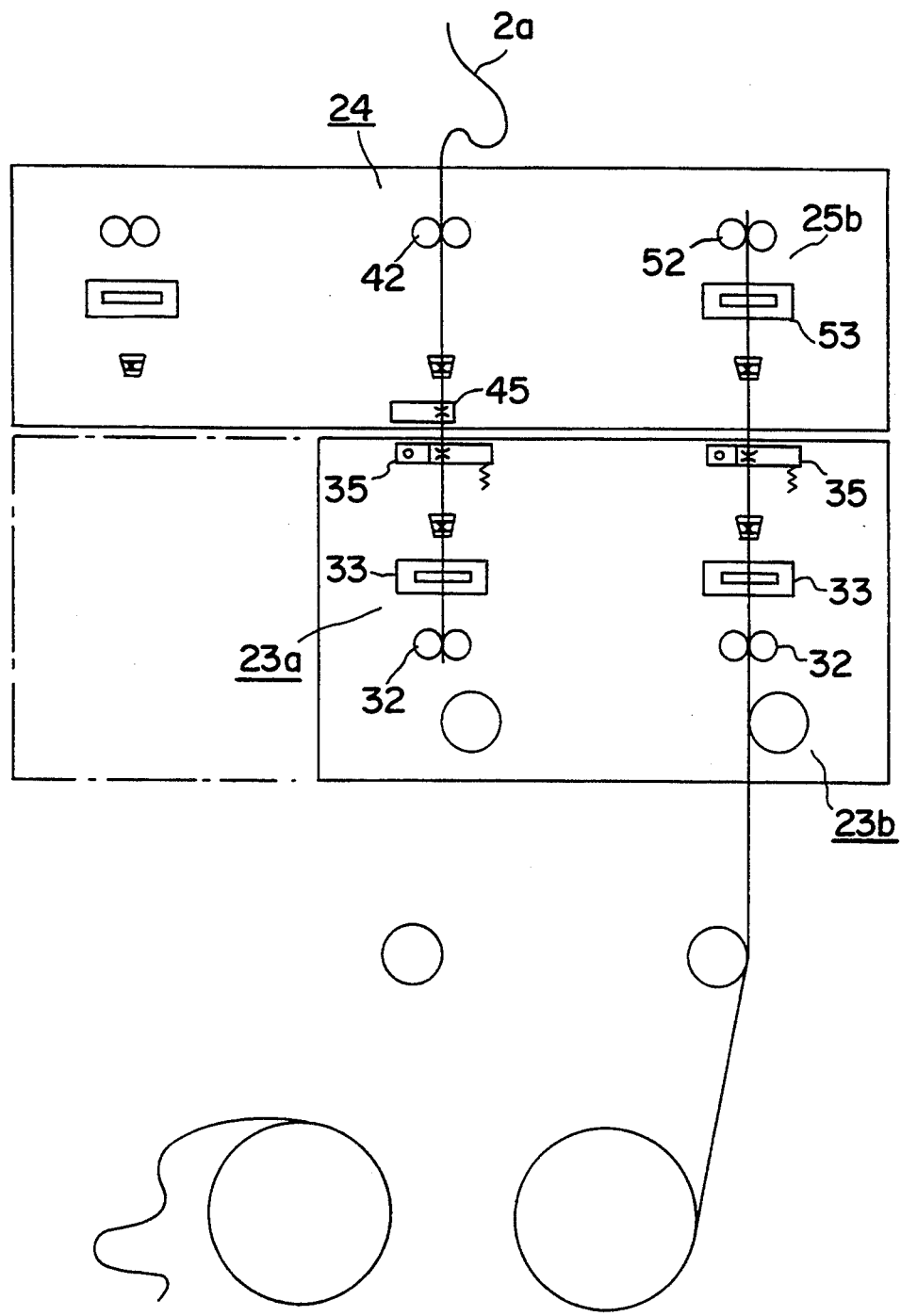
FIG. 11 illustrates, in schematic form, a front view of an embodiment of the present invention during a retry operation.

Referring now to FIG. 10, the retry operation in the case of an unsuccessful joining of wire ends is described. In this operation, the process for trimming the trailing end of the wire 2a and the process for trimming the leading end of the wire 2b is carried out in parallel. In FIG. 11, the process for trimming the wire 2a is carried out using the in-feed unit 23a on the left in the figure and the out-feed unit 24, returning the table 21 to its right stroke limit so that the in-feed unit 23a (which the wire is not passed through) is opposite to the out-feed unit 24. The clamp rollers 42 feed the trailing end of the wire 2a downwardly to the clamp roller 32 with the clamps 35 and 45 and the clamp rollers 32 opened. Then the clamp rollers 42 stop feeding and the clamp rollers 32 pinch the wire 2a.

Next, the clamp 48 closes and the cutter 33 cuts the wire 2a. The clamp rollers 32 then open to release the sheared end of the wire 2a. The clamp rollers 42 feed the wire upwardly until the other sheared end is positioned slightly protruding from the clamp 45.

In parallel with this process (as shown in FIG. 11), the process for trimming the leading end of the wire 2b is carried out using the in-feed unit 23b on the right side in the figure and the preparatory unit 25b. The in-feed unit 23b and the preparatory unit 25b are positioned opposite to each other with the table 21 at its right stroke limit. The clamp rollers 32 close and feed the leading end of the wire 2b upwards toward and into the clamp roller 52 with the clamps 35 opened. Then the clamp rollers 32 stop feeding and the clamp rollers 52 pinch the wire 2b.

Next, the clamp 35 is actuated to its lower position and closes and the cutter 53 cuts the wire 2b. The clamp rollers 32 feed the wire downwardly until the sheared end contiguous with the bobbin 1b is slightly protruding from the clamp 35.

Figure 8:
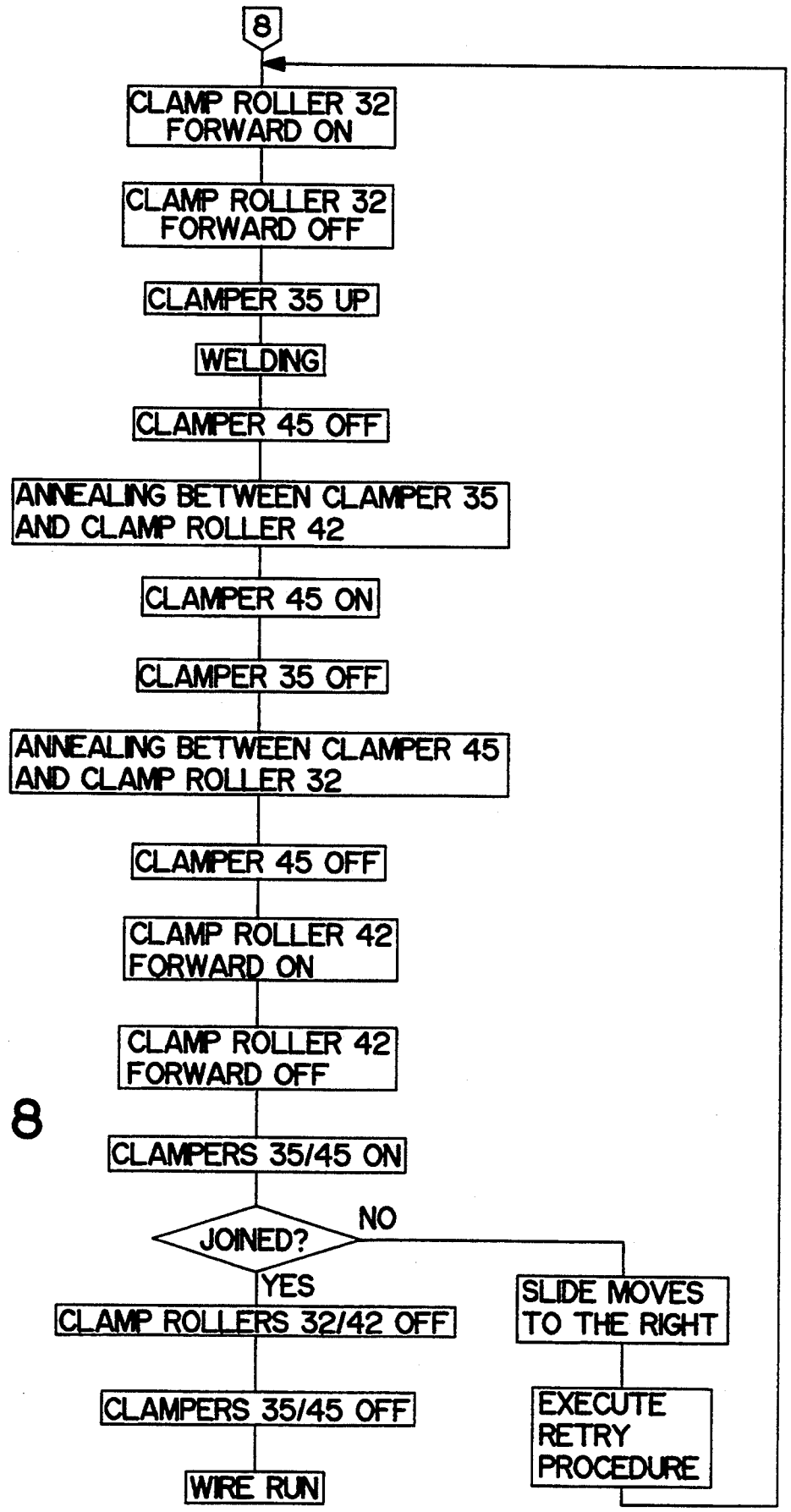
FIG. 8 is a flowchart of wire joining and confirmation operations.

Then, when both of the above parallel processes have been completed, the table 21 is moved to its left stroke limit (as viewed in the figure) and the new sheared ends of wires 2a and 2b are positioned opposite to each other to again carry out the joining operation in accordance with the procedures illustrated in FIGS. 6 and 8. The number of times a retry operation may be carried out may be set by the program in the control unit of the electric discharge machine. A wire of a predetermined length may only be slackened as described above in connection with FIG. 6 for purposes of retry of a predetermined number of times.

The foregoing description of preferred embodiment of the invention has been presented for purposes of illustration and description. It is not intended to be exhaustive or to limit the invention to the precise form disclosed, and obviously many modifications and variations are possible in light of the above teaching. For example, the bobbins 1a and 1b may be provided on the movable table 21. The clamp 45 in the out-feed unit 24 may advance and retract with respect to the clamp 35 in the in-feed unit. When the sheared end of the wire 2b is positioned to slightly protrude from the clamp 35, the rolling amounts of the clamp rollers 32 may be controlled. It is intended that the scope of the invention be defined by the claims appended hereto.

We claim:

1. A wire feed device for a wire-cut electroerosion apparatus for machining a workpiece (16) having a wire transport path, including wire drive means (19) for driving a wire electrode along said wire transport path, and further including a first wire electrode (1a), a second wire electrode (1b), a first bobbin (2a) on which said first wire electrode is wound, and a second bobbin (2b) on which said second wire electrode is wound, said first and second bobbins being replaceable for feeding said second wire electrodes into position to machine said workpiece after consuming said first wire electrode, said device comprising:
   a first cutter (33) positioned along said wire transport path for cutting said first wire electrode off said first bobbin;
   a first clamp (45) positioned along said wire transport path for clamping a trailing end of said first wire electrode;
   a table (21) adjacent to said first clamp and including a second clamp (35) for clamping a leading end of said second wire electrode from said second bobbin along a wire waiting path (23b), said table being movable to traverse said wire transport path, whereby said first and second clamps may be positioned opposite each other;
   means for driving one or both of said first and second clamp relative to the other to position the leading end of said second wire and the trailing end of said first wire into an abutting relationship;
   means for joining the abutted wire ends, wherein said wire drive means (19) is operable to drive the joined wire along said wire transport path.

2. The wire feeding device according to claim 1, wherein said means for joining comprises an electrical circuit connected to said first and second clamps and operable to cause a current to flow therebetween through the wires.

3. The wire feeding device according to claim 2, further comprising means for feeding said first wire forward or backward so that the trailing end thereof is slightly protruding from said first clamp.

4. The wire feed device according to claim 3, wherein said first wire feeding means comprises a first pair of clamp rollers (42).

5. The wire feeding device according to claim 3, wherein said table further includes means for feeding said second wire forward or backward so that the leading end thereof is slightly protruding from said second clamp.

6. The wire feed device according to claim 5, wherein said second wire feeding means comprises a second pair of clamp rollers (32).

7. The wire feeding device according to claim 5, wherein said first cutter is positioned on said table.

8. The wire feeding device according to claim 7, further comprising means (53) for trimming a leading end of said second wire which is fed forward through said wire waiting path by said means for feeding said second wire.

9. The wire feeding device according to claim 8, wherein said table further comprises a second cutter (33) positioned along said wire waiting path, and wherein a third clamp (35) and a third pair of clamp rollers (23a) are positioned on said table to form a second wire waiting path with said first cutter.

10. The wire feeding device according to claim 9, further comprising a spare bobbin for replacing said first bobbin when its wire is spent, said spare bobbin having a third wire wound thereon, said device further comprising a second means (53) for trimming a tip of said third wire fed forward along said second wire waiting path by said third pair of clamp rollers.

11. The wire feeding device of claim 8, further comprising an annealing circuit (90) for annealing the joined wire in the vicinity of the joint.

12. The wire feeding device of claim 8, wherein during machining a machining slit is cut in said workpiece, and further comprising means for decreasing a diameter of the joint of wires whereby the joint may smoothly pass through said wire transport path including said machining slit.

13. The wire feeding device according to claim 1, further comprising cutting means (13), positioned proximate to the workpiece, for servering said joined wire above and below said abutted wire ends; to thereby create a new wire end; and auxiliary drive means (9) for positioning said joined wire with respect to said cutting means (13) and for feeding said new wire end towards said drive means (19).

14. A method of feeding a wire electrode through a wire transport path, including a wire transport device (19), in a wire-cut electroerosion apparatus having a first wire (1a) and a second wire (1b), a first replaceable bobbin (2a) on which said first wire is would and a second replaceable bobbin (2b) on which said second wire is wound, a first clamp and a second clamp, comprising the steps of:
   (a) stopping the movement of said first wire along said wire transport path;
   (b) cutting off the first wire from said first bobbin (1b) and clamping a trailing end of said first wire at a position along said wire transport path by means of said first clamp;
   (c) clamping a leading end of said second wire contiguous with the wire in said second bobbin at a position outside of said wire transport path by means of said second clamp;
   (d) moving the second clamp into a position whereby the trailing end of said first wire and the leading end of said second wire abut each other;
   (e) joining the abutted wire ends together; and
   (f) restarting the movement of the joined wire along said wire transport path.

15. The method of feeding according to claim 14, wherein step (e) further comprises the step of passing a current through the portion of said first and second wires positioned between said first and second clamps.

16. The method of wire feeding according to claim 15, further comprising the step of trimming a tip of said second wire prior to step of joining the wire ends, 17. The method of wire feeding according to claim 16, further comprising the step of annealing the joined wire in the vicinity of the joint.

18. The method of wire feeding according to claim 17, further comprising the step of decreasing a diameter of the Joint between the wires whereby the joint may smoothly pass through said wire transport path.

19. The method of wire feeding according to claim 14, wherein step (d) comprises moving said second clamp in a direction transverse to said wire transport path until the leading end of the second wire is in said wire transport path, and then moving at least one of said leading and trailing ends relative to the other until said ends abut.

20. The method according to claim 14, further comprising the steps of:
   (g) moving said joined wire until said joined abutted wire ends are positioned along said wire transport path proximate to said workpiece;
   (h) cutting out from said joined wire a section containing the abutted wire ends to thereby create a new wire end; and
   (i) feeding said wire along said wire transport path until said new wire end is taken up by said wire transport device.

21. A method for feeding a wire through a wire transport path of a wire-cut electroerosion apparatus having a first wire (1a) and a second wire (1b), a first bobbin (2a) on which said first wire is wound and a second bobbin (2b) on which said second wire is wound, comprising the steps of:
   (a) stopping the travel of said first wire along said wire transport path;
   (b) cutting said first wire off said first bobbin, thus creating a trailing end of said first wire;
   (c) positioning a leading end of said second wire and the trailing end of said first wire into abutting relationship with each other;
   (d) joining the abutted wire ends together;
   (e) checking the integrity of the joining of the wire ends; and
   (f) restarting the traveling of the joined wire through said wire transport path.

22. The method of wire feeding according to claim 21, further comprising the step of retrying the step of joining the abutted ware end when the step of the ware joining is unsuccessful.

23. The method of wire feeding according to claim 22, further comprising the step of trimming the ends of said first and second wires prior to the retrying step.

24. The method of wire feeding according to claim 21, wherein step (e) further comprises checking for electrical continuity between said first and second wires while applying a tensile load on said joint.

25. The method of wire feeding according to claim 21, wherein step (e) further comprises detecting the existence of a feed motion of one of said first and second wires when feeding the other said wires away from said one wire.

26. The method according to claim 21, wherein said wire transport path includes a wire transport device for driving said wire during machining and a working zone wherein a workpiece to be machined may be positioned and further comprise the steps of:
   (j) moving said joined wire until the joined, abutted wire ends are positioned along said wire transport path at a wire-threading position;
   (k) cutting out from said joined wire a section contained said joined, abutting wire ends to thereby create a new wire end;
   (l) threading said new wire end along said wire transport path through said working zone and into engagement with said wire transport device.

27. A spare wire feed device for a wire cut electroerosion apparatus having a wire transport path, including a wire transport means and a machining zone wherein a workpiece to be machined is positioned and a wire waiting path, said apparatus further comprising a first wire electrode and a second wire electrode, a first wire bobbin on which said first wire electrode is wound, and a second wire bobbin on which said second wire electrode is wound, each of said first and second bobbins being replaceable with the other as the wire electrode wound on it is spent during machining operations; one of said first and second wire electrodes being drawn by said wire transport means along said wire transport path during machining operations, while the other is positioned in said wire waiting path, said device comprising:
   means, positioned along said wire transport path, for cutting the wire electrode positioned in said wire transport path from its associated wire bobbin, creating a trailing wire end;
   means for clamping said trailing wire end;
   means, positioned along said wire waiting path, for clamping the leading end of the wire electrode positioned in the wire waiting path;
   means for moving said clamped leading end into said wire transport path and into an end-to-end abutting relationship with said trailing end;
   means for joining said abutted ends to form a joined wire, whereby said wire transport means can drive said joined wire through said wire transport path.

28. The device according to claim 27, wherein said means for moving comprises a moveable table on which said means for clamping said leading wire end is disposed, said table being moveable in a direction transverse to said wire transport path, whereby said clamped leading end is moveable between said wire waiting path and said wire transport path.

29. The apparatus according to claim 27, further comprising:
   means, positioned on the upstream side of said working zone, for cutting out a section of joined wire containing said joined abutted ends to thereby create a new wire end;
   means for threading said new wire end through said working zone and into engagement with said wire transport means.

30. A method of continuously feeding a wire electrode through a wire-cut electroerosion machine having a wire transport path, including a machining zone wherein a workpiece to be machined may be positioned, and means for driving said wire electrode along said wire transport path, said method comprising the steps of:
   providing a first wire electrode wound on a first wire bobbin;
   providing a second wire electrode wound on a second wire bobbin, each of said first and second wire bobbins being replaceable with the other as the wire electrode wound on it is spent during machining operations;
   driving one of said first and second wire electrodes through said wire transport during machining operations;
   positioning the other of said first and second wire electrodes in a wire-wait path, whereby a leading end of said other wire is clamped in said wire-wait path;
   stopping the movement of said one wire electrode along said wire transport path when the amount of wire remaining in its associated bobbin falls to a predetermined level;
   cutting said one wire electrode from its bobbin, thereby creating a trailing wire end, and clamping said trailing wire end;

moving the trailing end of said one wire and the leading end of said other wire into an abutting end-to-end relationship;

joining the abutted wire ends together; and driving said joined wire along said wire transport path.

31. The method according to claim 30, further comprising the step of checking the integrity of said joint prior to the step of driving the Joined wire.

32. The method according to claim 31, further comprising the step of retrying the step of joining the abutted wire ends when the step of joining is unsuccessful.

33. The method according to claim 30, wherein the step of joining further comprises the step of welding the said leading and trailing ends together to create a joint.

34. The method according to claim 33, wherein said step of joining further comprises the step of annealing the joined wire in the vicinity of said joint.

35. The method according to claim 33, further comprising the step of reducing the diameter of said joint.

36. The method according to claim 30, wherein the step of moving further comprises moving the leading end of said other wire electrode into said wire transport path and then into said end-to-end abutting relationship with the trailing end of said one wire.

37. The method according to claim 30, further comprising the steps of:

moving said joined wire until the joined abutted wire ends are positioned along said wire transport path at a wire-threading position;

cutting out from said joined wire a section contained said joined, abutting wire ends to thereby create a new wire end;

threading said new wire end along said wire transport path through said working zone and into engagement with said wire transport device.

* * * * *